(12) United States Patent
Oga (10) Patent No.: US 10,528,105 B2
(45) Date of Patent: Jan. 7, 2020

(54) ELECTRONIC APPARATUS

(71) Applicant: Panasonic Intellectual Property Management Co., Ltd., Osaka (JP)

(72) Inventor: Tadashi Oga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/788,448

(22) Filed: Oct. 19, 2017

(65) Prior Publication Data

US 2018/0039310 A1 Feb. 8, 2018

Related U.S. Application Data

(63) Continuation of application No. PCT/JP2016/004534, filed on Oct. 11, 2016.

(30) Foreign Application Priority Data

Dec. 25, 2015 (JP) .................... 2015-254438

(51) Int. Cl.
*G06F 1/26* (2006.01)
*G06F 1/16* (2006.01)

(52) U.S. Cl.
CPC ............ *G06F 1/263* (2013.01); *G06F 1/1615* (2013.01); *G06F 1/1632* (2013.01); *G06F 1/1654* (2013.01); *G06F 1/1681* (2013.01); *G06F 1/266* (2013.01)

(58) Field of Classification Search
CPC ...... G06F 1/1632; G06F 1/1654; G06F 1/263; G06F 1/266; G06F 1/1615
See application file for complete search history.

(56) References Cited

U.S. PATENT DOCUMENTS 5,619,397 A * 4/1997 Honda ................. G06F 1/1632
361/679.43
5,719,799 A * 2/1998 Isashi .................... G06F 1/1618
345/169

(Continued)

FOREIGN PATENT DOCUMENTS

JP 7-072961 3/1995
JP 2002-123337 4/2002

(Continued)

OTHER PUBLICATIONS

International Search Report of PCT application No. PCT/JP2016/004534 dated Dec. 27, 2016.

*Primary Examiner* — Adrian S Wilson
(74) *Attorney, Agent, or Firm* — Renner, Otto, Boisselle & Sklar, LLP (57) ABSTRACT

An electronic apparatus in accordance with the present disclosure includes a first housing for accommodating a first circuit, a second housing for accommodating a second circuit, a plurality of hinge sections connecting with the first housing and allowing the second housing to rotate with respect to the first housing, a first power supply wiring for supplying electric power from the first circuit to the second circuit and a second power supply wiring for supplying electric power from the second circuit to the first circuit. The first power supply wiring and the second power supply wiring are situated to be led through any one of the plurality of hinge sections.

5 Claims, 10 Drawing Sheets (56) References Cited

U.S. PATENT DOCUMENTS

| | | | | |
|---|---|---|---|---|
| 5,793,606 A | * | 8/1998 | Cubbage | G06F 1/1601 |
| | | | | 361/679.29 |
| 2001/0022719 A1 | * | 9/2001 | Armitage | G06F 1/16 |
| | | | | 361/679.17 |
| 2010/0067197 A1 | * | 3/2010 | Guccione | G06F 1/1632 |
| | | | | 361/728 |
| 2011/0068736 A1 | * | 3/2011 | Chartier | H02J 7/0052 |
| | | | | 320/107 |
| 2013/0170126 A1 | * | 7/2013 | Lee | G06F 1/1654 |
| | | | | 361/679.17 |
| 2013/0222991 A1 | * | 8/2013 | McWilliams | G06F 1/1632 |
| | | | | 361/679.4 |
| 2013/0328399 A1 | | 12/2013 | Suzuki et al. | |
| 2013/0334883 A1 | * | 12/2013 | Kim | H02J 7/34 |
| | | | | 307/29 |
| 2014/0132216 A1 | * | 5/2014 | Tan | G06F 1/263 |
| | | | | 320/114 |
| 2014/0299372 A1 | * | 10/2014 | Meazell | G06F 1/263 |
| | | | | 174/74 R |
| 2014/0307376 A1 | * | 10/2014 | Lee | G06F 1/1632 |
| | | | | 361/679.4 |
| 2017/0090516 A1 | * | 3/2017 | Ku | G06F 1/1632 |

FOREIGN PATENT DOCUMENTS

| | | |
|---|---|---|
| JP | 2007-293400 | 11/2007 |
| JP | 2013-254408 | 12/2013 |

\* cited by examiner

ELECTRONIC APPARATUS

BACKGROUND

Technical Field

The present disclosure relates to an electronic apparatus formed of a first housing and a second housing, which is connected to the first housing in a rotatable manner.

Description of the Related Art

Patent literature 1 discloses an information processing apparatus comprising a display section including a liquid crystal display (LCD) panel, a control section for controlling a display on the LCD panel, and a secondary battery unit for supplying electric power to the LCD panel and the control section for driving them. The secondary battery unit of this information processing apparatus is placed on a rear side of the LCD panel with at least one battery cell being exposed in a display section. The placement of the LCD panel on the rear side with the battery cell being exposed allows minimizing a thickness of the secondary battery unit, whereby not only a display section, in which the secondary battery cell is placed, but also the information processing apparatus can be formed thinner than before.

Patent literature 2 discloses a portable information processing apparatus formed of a main apparatus body and a detachable display apparatus.

Citation List

Patent Literature 1: Unexamined Japanese Patent Application Publication No. 2002-123337
Patent Literature 2: Unexamined Japanese Patent Application Publication No. 2007-293400

SUMMARY

The present disclosure provides an electronic apparatus formed of a first housing and a second housing connected in a rotatable manner to the first housing. This electronic apparatus allows reducing noise radiation therefrom.

An electronic apparatus in accordance with a first aspect of the present disclosure includes the following structural elements:
- a first housing for accommodating a first circuit;
- a second housing for accommodating a second circuit;
- a plurality of hinge sections connecting with the first housing and allowing the second housing to rotate with respect to the first housing;
- a first power supply wiring for supplying electric power from the first circuit to the second circuit; and
- a second power supply wiring for supplying electric power from the second circuit to the first circuit.

The first power supply wiring and the second power supply wiring are situated to be led through any one of the plurality of hinge sections.

According to the present disclosure, the electronic apparatus, which is formed of the first housing and the second housing connected to the first housing via the hinge sections in a rotatable manner, allows reducing the noise radiation.

DETAILED DESCRIPTION

Exemplary embodiments of the present disclosure are demonstrated hereinafter with reference to the accompanying drawings. Descriptions more than necessary are sometimes omitted. For instance, well-known matters are not necessarily detailed, and structures substantially the same with each other are not necessarily duplicated. These omissions will avoid redundant descriptions, and allow ordinary skilled persons in the art to understand the present disclosure with ease.

The accompanying drawings and the descriptions below are provided for the ordinary skilled persons in the art to fully understand the present disclosure, and the scope of the claims are not limited to these materials.

First Exemplary Embodiment 1-1. Overall Structure

Figure 1:
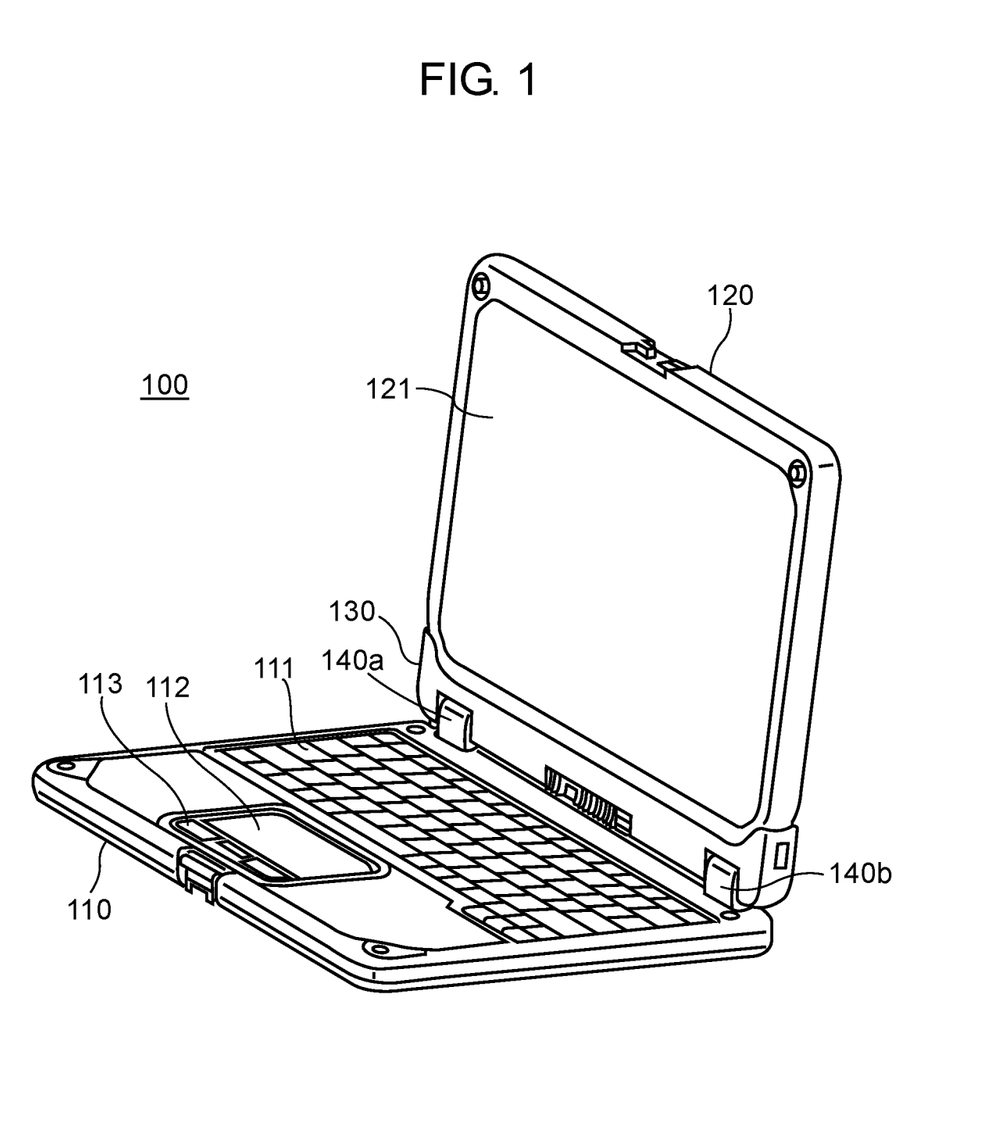
FIG. 1 is a perspective view of an information processing apparatus in accordance with a first embodiment of the present disclosure.

FIG. 1 is a perspective view of an information processing apparatus, which is an example of an electronic apparatus in accordance with the first embodiment of the present disclosure. As shown in FIG. 1, information processing apparatus 100 includes first housing 110 and second housing 120, which is detachable from first housing 110. Attachment of second housing 120 to first housing 110 allows information processing apparatus 100 to be used as a notebook computer. Second housing 120 alone can be used. In this case, a user can use information processing apparatus 100 as a tablet computer. Information processing apparatus 100 thus can be used as a detachable computer.

Second housing 120 alone can be used as a computer, and includes display section 121 formed of, for instance, an LCD device. Display section 121 is mounted to a first principal surface of second housing 120. Display section 121 can be formed of another display device such as an organic EL device. Display section 121 has a touch panel for receiving a touch by a user, and this touch is superimposed on the LCD device. In order to fulfil the function of a computer, second housing 120 includes a central processing unit (CPU), a volatile memory (e.g. RAM), non-volatile memory (e.g. ROM, SSD), and a battery. The non-volatile memory (ROM, SSD) stores an operating system (OS), some application programs, and some data. The CPU reads the OS, the application program, and the data for carrying out a computation process, thereby executing various functions.

First housing 110 includes hinge sections 140a and 140b for supporting holder 130 in a rotatable manner. Hinge sections 140a and 140b are unitarily formed with first housing 110, which is made of, for instance, metal such as magnesium alloy, or resin. First housing 110 includes an input section for a user to input data to information processing apparatus 100. To be more specific, the input section is, for instance, keyboard 111, touch pad 112, and operation button 113 and the like.

Holder 130 holds parts of second housing 120, which is thus fit into holder 130. When second housing 120 is fit into holder 130, which then connects electrically a circuit in first housing 110 to a circuit in second housing 120 via a connecter (detailed later).

Hinge sections 140a and 140b connect with holder 130 such that holder 130, viz. second housing 120, can rotate about first housing 110.

Figure 2:
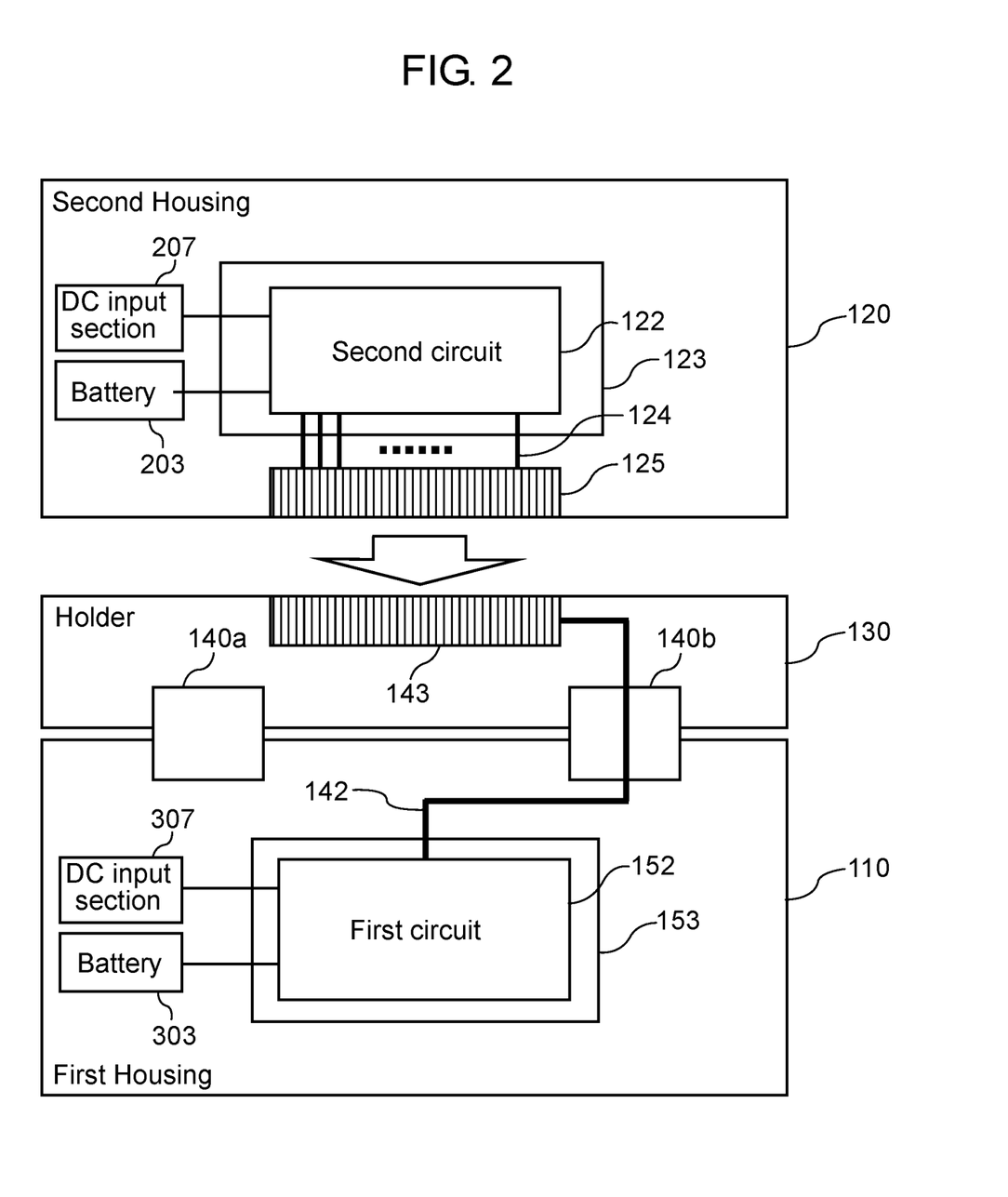
FIG. 2 illustrates schematically electrical connections between housings in the information processing apparatus in accordance with the first embodiment.

FIG. 2 illustrates schematically the electrical connections between first housing 110, second housing 120 and holder 130.

First housing 110 includes first circuit 152, battery 303, and DC input section 307. First circuit 152 is mounted on first circuit board 153, and represents a variety of electronic components and circuits within first housing 110. The electronic components and circuits included in first circuit 152 are connected to wiring 142 via first circuit board 153.

Second housing 120 includes second circuit 122, battery 203, DC input section 207, and connector 125. Second circuit 122 is mounted on second circuit board 123, and represents a variety of electronic components and circuits within second housing 120. The electronic components and circuits included in second circuit 122 are connected to wiring 124 via second circuit board 123. Holder 130 includes connector 143 to be connected to connector 125 of second housing 120.

Batteries 203 and 303 are rechargeable secondary battery (e.g. lithium ion battery). DC input sections 307 and 207 are devices (e.g. input terminals) for receiving a DC voltage supplied from an AC adaptor that converts a given ac voltage to a DC voltage.

First circuit 152 in first housing 110 is electrically connected to connector 143 of holder 130 via wiring 142. In FIG. 2, wiring 142 represents, for a purpose of convenient description, signal lines for transmitting signals and power supply wirings for transmitting electric power. Actually wiring 142 includes power supply wirings 142a and 142b detailed later. Power supply wiring 142a supplies a power supply voltage from first circuit 152 (or first circuit board 153) in first housing 110 to second circuit 122 (or second circuit board 123) in second housing 120. Power supply wiring 142b supplies a power supply voltage from second circuit 122 (or second circuit board 123) in second housing 120 to first circuit 152 (or first circuit board 153) in first housing 110.

In second housing 120, second circuit 122 is electrically connected to connector 125 via wiring 124. Connector 125 of second housing 120 is electrically connected to connector 143 of holder 130. Wiring 124 includes signals lines for transmitting signals and power supply wirings for transmitting electric power.

An attachment of second housing 120 to holder 130 allows connector 125 of second housing 120 to electrically connect with connector 143 of holder 130. This structure allows transmitting signals and electric power between second circuit 122 in second housing 120 and first circuit 152 in first housing 110.

In this first embodiment, in particular, wiring 142 including the signal lines and power supply wirings for transmitting the signals and electric power between first housing 110 and second housing 120 is led through one of two hinge sections 140a and 140b (in this embodiment, hinge section 140b is used). This structure allows reducing noise radiation (detailed later).

Figure 3:
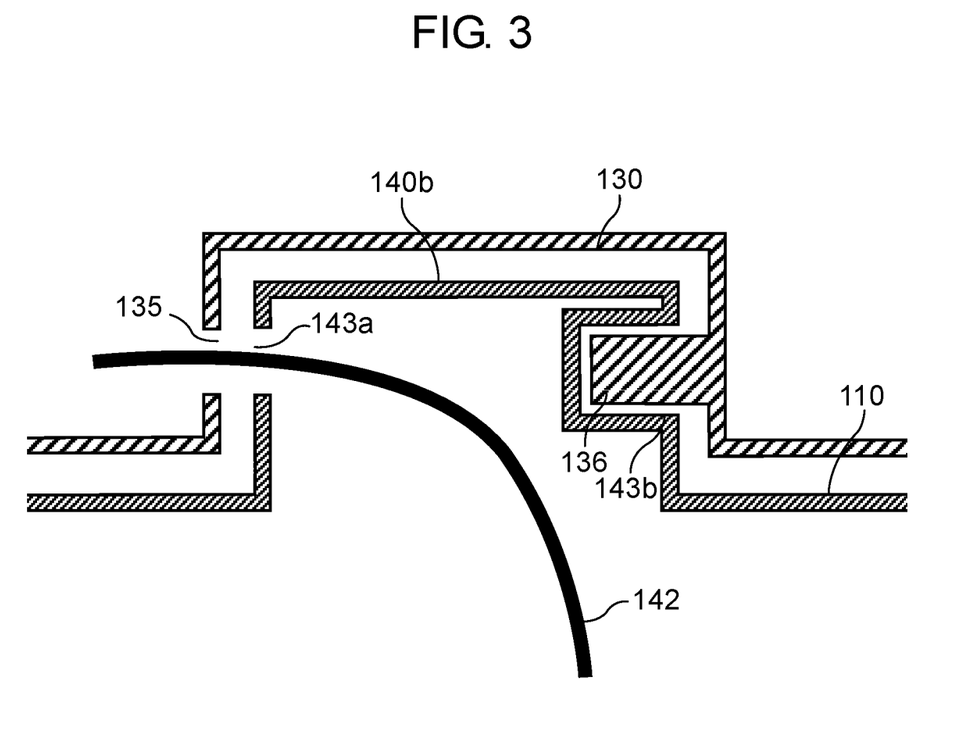
FIG. 3 illustrates schematically a structure of a hinge-section, through which a power supply wiring is led.

FIG. 3 illustrates interior structures of hinge section 140b and holder 130. These structures are particularly designed for wiring 142 to pass through so that the circuits in first housing 110 and second hosing 120 can be electrically connected together.

As FIG. 3 shows, hinge section 140b has opening 143a on a first lateral face and recess 143b on a second lateral face. Holder 130 has opening 135 confronting opening 143a of hinge section 140b and protrusion 136 confronting recess 143b of hinge section 140b. Protrusion 136 is cylindrically formed and inserted in recess 143b of hinge section 140b. Protrusion 136 is supported by an inner wall of recess 143b and functions as a rotary shaft.

Wiring 142 is led through opening 135 of holder 130 and opening 143a of hinge section 140b, viz. wiring 142 is led from holder 130 to hinge section 140b (or from hinge section 140b to holder 130). Hinge section 140b is unitarily formed with first housing 110, so that an interior space of hinge section 140b communicates with an interior space of first housing 110. The other hinge section 140a can be in any form as long as it can support, together with hinge section 140b, holder 130 in a rotatable manner with respect to first housing 110.

The structure, shown in FIG. 3, of hinge section 140b allows wiring 142 to be led through holder 130 and hinge section 140b, whereby second circuit 122 in second housing 120 can be electrically connected to first circuit 152 in first housing 110.

1-1-1. Power Supply Wiring

Figure 4:
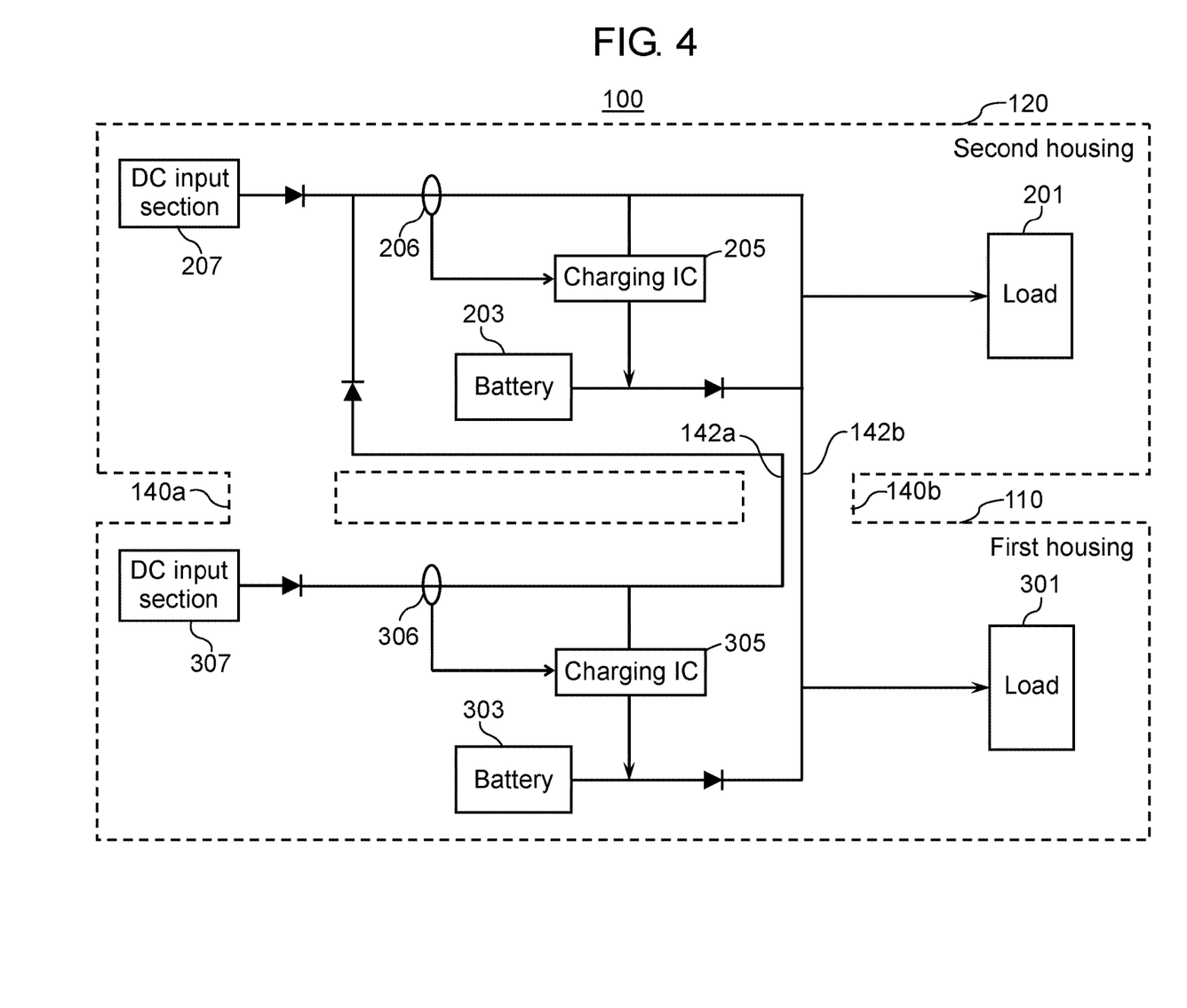
FIG. 4 illustrates schematically power supply wirings in a first and a second housing of the information processing apparatus in accordance with the first embodiment.

FIG. 4 illustrates structural elements and power supply wirings concerning the power supply in information processing apparatus 100 in accordance with the first embodiment.

First housing 110 accommodates the following structural elements:
battery 303 for supplying a DC power supply voltage to load 301;
charging IC 305 for controlling the charge to battery 303;
current sensor 306 for sensing an electric current; and
DC input section 307 for receiving a given DC voltage.
Load 301 includes a variety of circuits (e.g. a circuit for driving a keyboard or a touch pad).

Second housing 120 accommodates the following structural elements:
battery 203 for supplying a DC power supply voltage to load 201;
charging IC 205 for controlling the charge to battery 203;
current sensor 206 for sensing an electric current; and
DC input section 207 for receiving a given DC voltage.

Load 201 includes a variety of circuits (e.g. a circuit for driving a CPU, display section 121, and a circuit for driving display section 121).

Current sensors 206 and 306 monitor the total of the charging current and the load current not to exceed the rating of an AC adaptor, viz. charging ICs 205 and 305 control the charging current to batteries 203 and 303 based on sensing signals from current sensors 206 and 306 such that the total of the charging current and the load current should not exceed the rating of the AC adaptor.

In first housing 110, charging IC 305 outputs an electric current to battery 303, which is connected to load 301 and load 201. An output from DC input section 307 is connected to charging IC 305, and an output from DC input section 307 is also connected to charging IC 205 and load 201 in second housing 120.

In second housing 120, charging IC 205 outputs an electric current to battery 203, which is connected to load 201 and load 301. An output from DC input section 207 is connected to charging IC 205 and load 201, and an output from DC input section 307 is also connected to load 301 in first housing 110.

In the foregoing information processing apparatus 100, when a DC current is supplied neither to DC input section 207 nor to DC input section 307, viz. the AC adaptor is not connected to information processing apparatus 100, electric power is supplied to loads 201 and 301 from battery 203 or battery 303.

On the other hand, when a DC current is supplied to DC input section 207 from the AC adaptor, viz. the AC adaptor is connected to information processing apparatus 100, the power supply voltage is supplied from DC input section 207 to battery 203, loads 201 and 301. When a DC voltage is supplied from the AC adaptor to DC input section 307, viz. the AC adaptor is connected to information processing apparatus 100, the power supply voltage is supplied from DC input section 307 to batteries 203, 303, and loads 201, 301.

As discussed above, this first embodiment shows that wiring 142 (i.e. signal line and power supply wiring) is wired between first housing 110 and second housing 120 for transmitting signals and electric power, and wiring 142 is led through one of hinge sections 140a and 140b (hinge section 140b is used in this embodiment). This structure allows reducing the noise radiation.

Information processing apparatus 100 addresses a problem when the power supply wiring is led through each of two hinge sections 140a and 140b. This problem is detailed hereinafter with reference to FIG. 5-FIG. 7.

Figure 5:
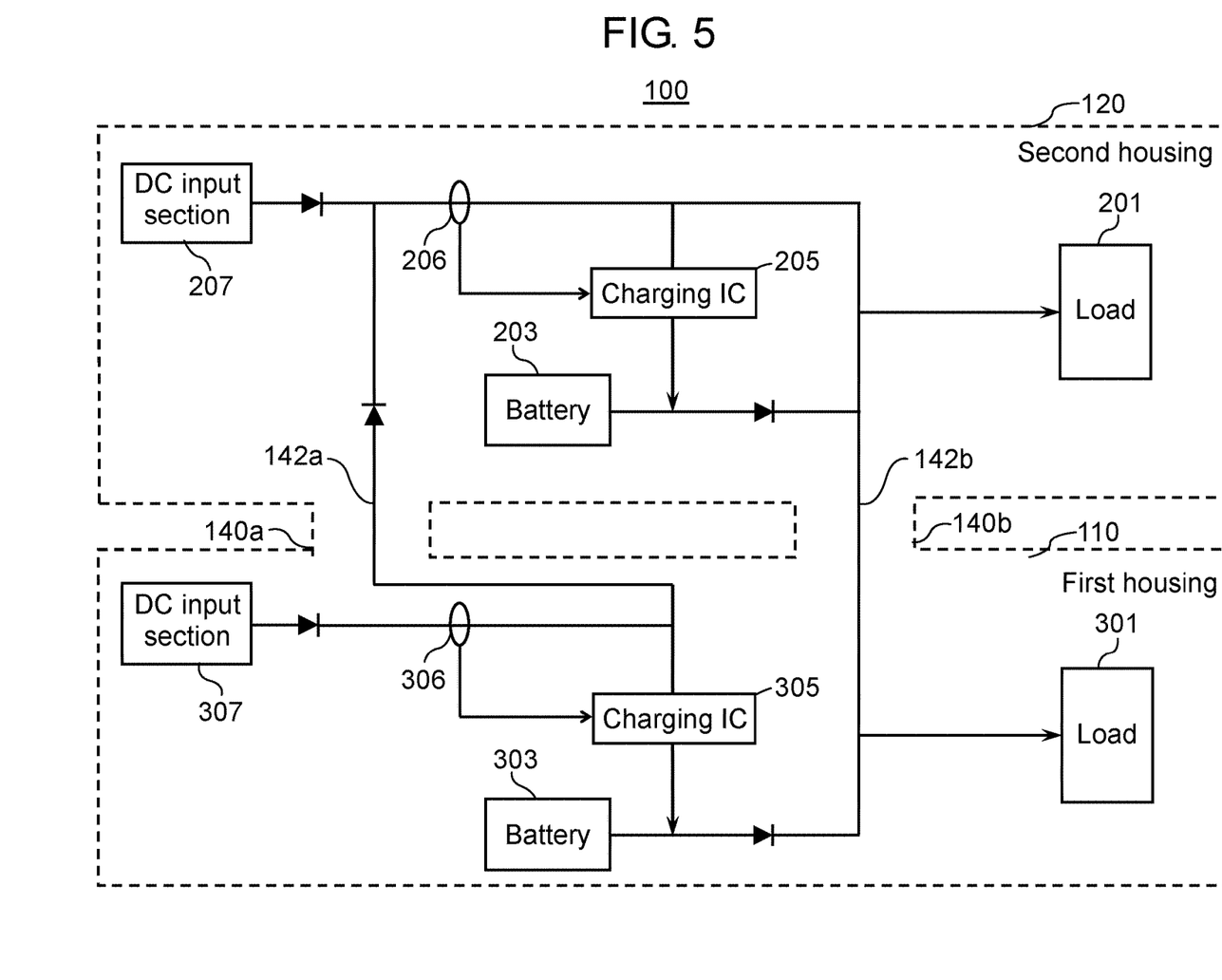
FIG. 5 illustrates schematically a problem to be solved by the present disclosure, viz. illustrating a structure of the information processing apparatus, in which power supply wirings are led through each one of hinges disposed at both ends.
Figure 6:
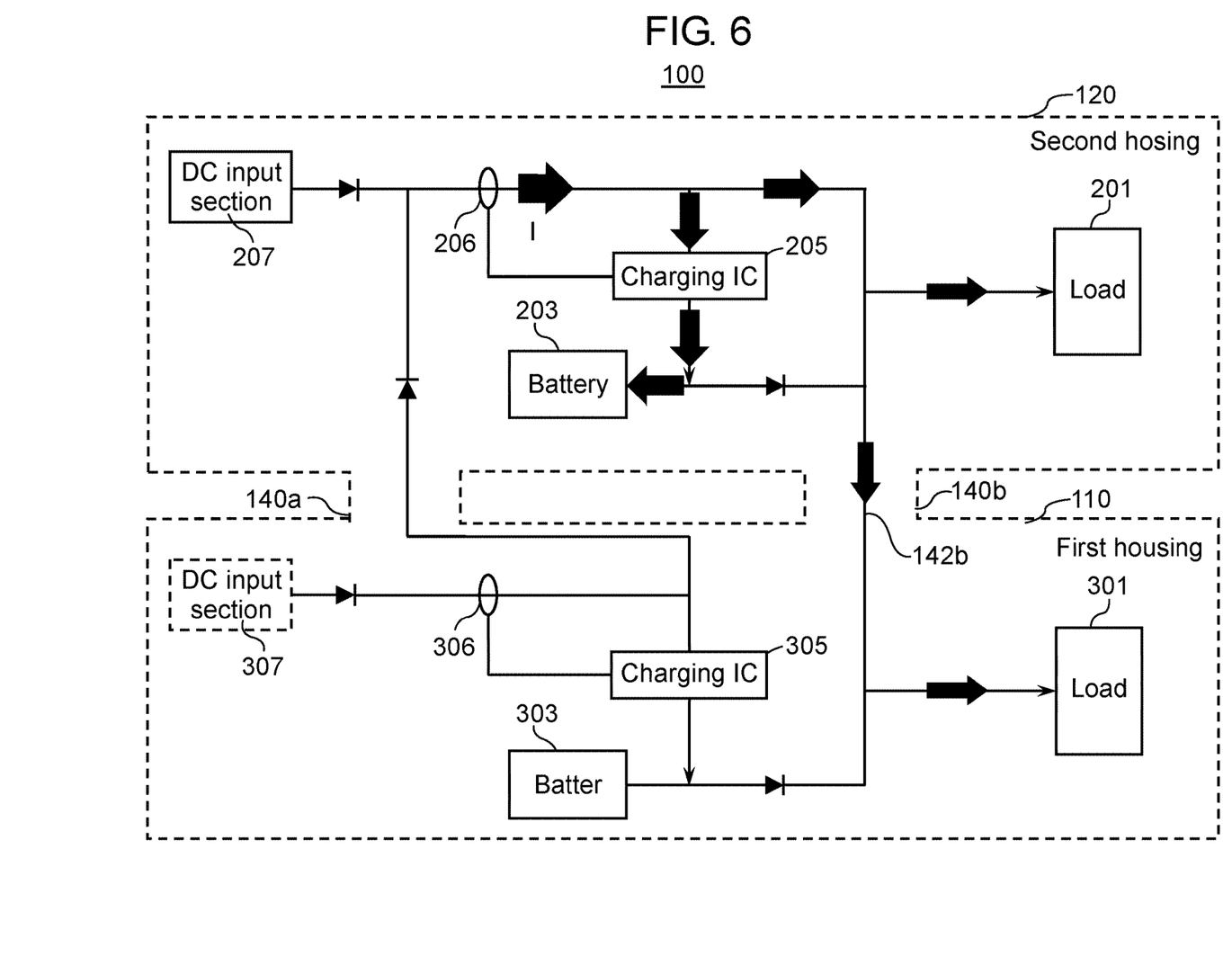
FIG. 6 illustrates schematically the problem to be solved by the present disclosure.
Figure 7:
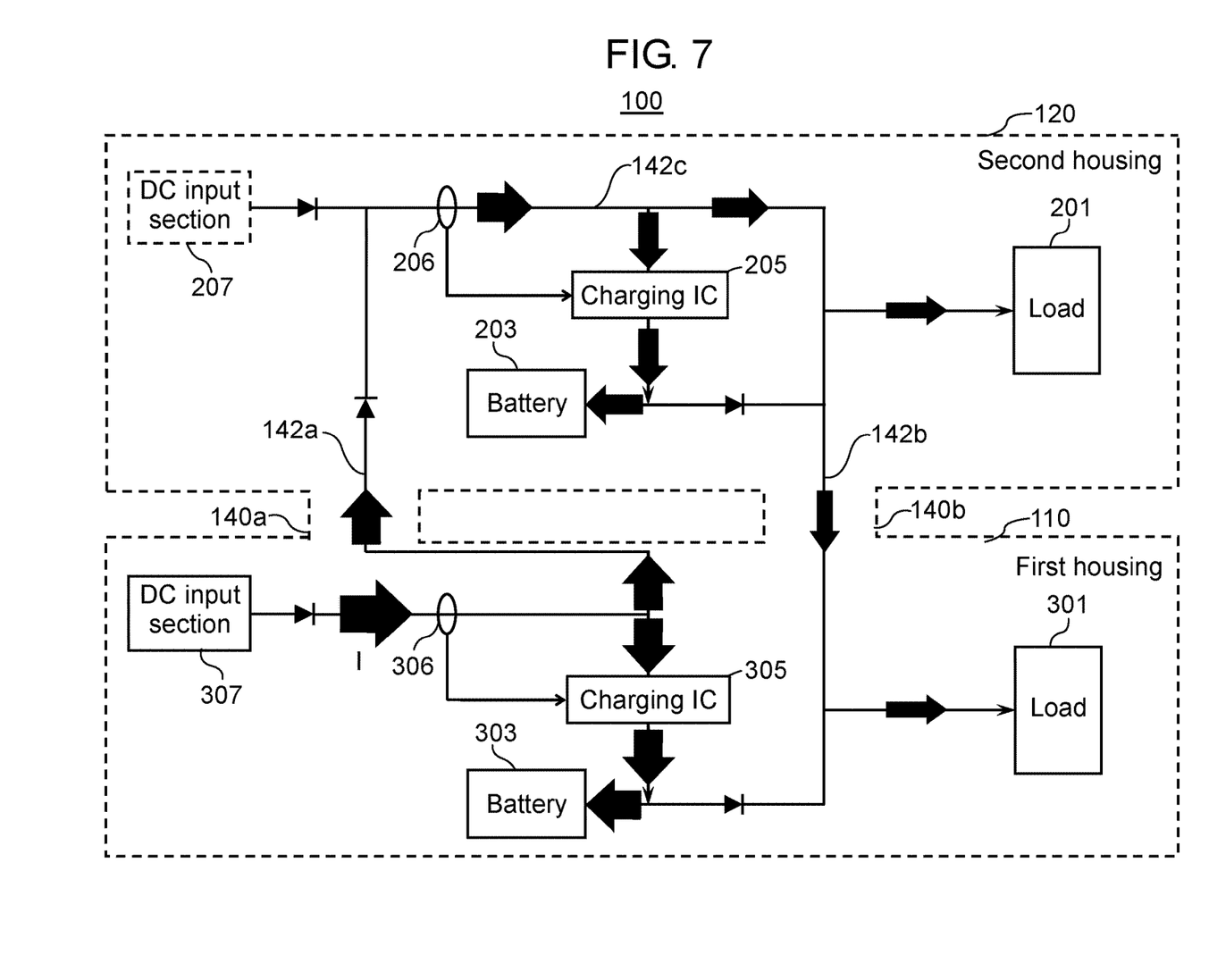
FIG. 7 illustrates schematically the problem to be solved by the present disclosure.

FIG. 5 shows schematically the wirings in information processing apparatus 100 when the power supply wiring is led through each one of two hinge sections 140a and 140b. FIG. 6 shows flows of electric current in first housing 110 and second housing 120 under the condition that a DC voltage is supplied from the AC adaptor to DC input section 207 of second housing 120, viz. the AC adaptor is connected to information processing apparatus 100. FIG. 7 shows flows of electric current in first housing 110 and second housing 120 under the condition that a DC voltage is supplied from the AC adaptor to DC input section 307 of first housing 110. The black arrows in FIGS. 6 and 7 represent the electric currents.

As shown in FIG. 6, in the case where a DC voltage is supplied from the AC adaptor to DC input section 207 of second housing 120, the electric current flows from DC input section 207 to load 201. On top of that, the electric current flows from DC input section 207 to battery 203 via charging IC 205, so that battery 203 is charged. The electric current supplied from DC input section 207 runs to load 301 through power supply wiring 142b situated in hinge section 140b. In the status shown in FIG. 6, no current loop is generated between first housing 110 and second housing 120, and a small amount of electric current runs there because only a load current is available. As a result, a problem concerning EMI seldom occurs.

As shown in FIG. 7, in the case where the DC voltage is supplied to DC input section 307 of first housing 110, the electric current runs from DC input section 307 to battery 303 via charging IC 305, so that battery 303 is charged. On top of that, the electric current from DC input section 307 flows into second housing 120 through power supply wiring 142a situated in hinge section 140a, and reaches to load 201 as well as to battery 203 (i.e. battery 203 is charged). At the same time, a part of the electric current flowing into second housing 120 via power supply wiring 142a situated in hinge section 140a runs though power supply wiring 142b situated in hinge section 140b, and then returns to first housing 110 before flowing to load 301.

As shown in FIG. 7, in the case where the DC voltage is supplied to DC input section 307 of first housing 110, the electric current flows through the path running from DC input section 307, power supply wiring 142a in first hinge section 140a, power supply wiring 142c of second housing 120, and power supply wiring 142b in second hinge section 140b, to load 301. As a result, an electric current loop is generated. This loop produces problematic noise radiation. In the status shown in FIG. 7, a large amount of charging current runs between the two housings in addition to the production of current loop, so that an EMI tends to occur.

To overcome the problem discussed above, information processing apparatus 100 in accordance with this first embodiment is structured as shown in FIG. 2 and FIG. 4, viz. power supply wirings 142a and 142b are led through only second hinge section 140b.

In the case where the DC voltage is supplied from the AC adaptor to either one of DC input section 207 or DC input section 307 in information processing apparatus 100, the electric current flowing through the power supply wirings in first and second housings 110 and 120 are described hereinafter.

Figure 8:
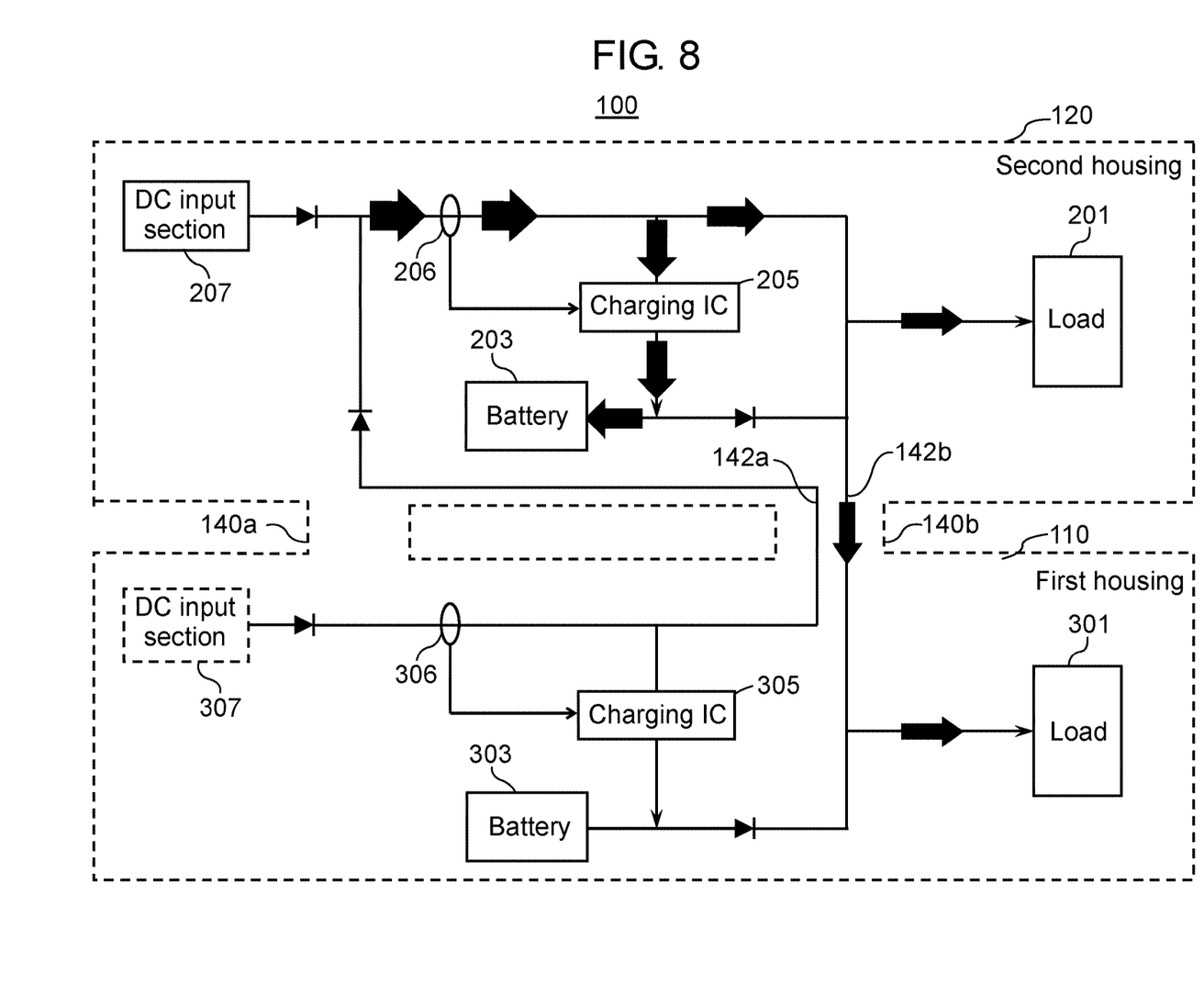
FIG. 8 illustrates flows of electric current in power supply wirings of the information processing apparatus in accordance with the first embodiment when a DC voltage is supplied from a second housing.
Figure 9:
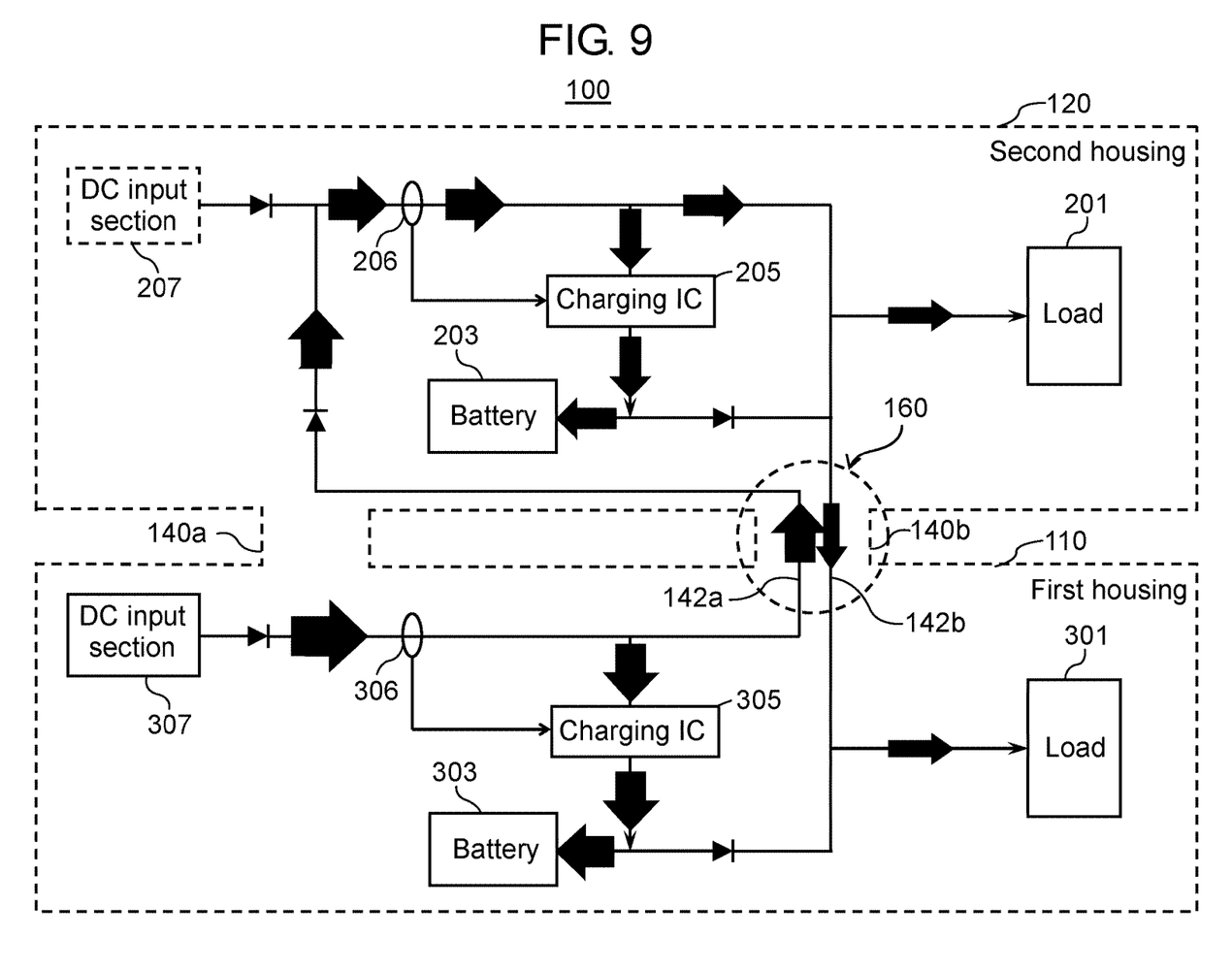
FIG. 9 illustrates flows of electric current in power supply wirings of the information processing apparatus in accordance with the first embodiment when a DC voltage is supplied from a first housing.

FIG. 8 illustrates the flow of electric current through the power supply wirings in first and second housings 110 and 120, in the case where the DC voltage is supplied from the AC adaptor, viz. when the AC adaptor is connected to information processing apparatus 100, to DC input section 207 of second housing 120. FIG. 9 illustrates the flow of electric current through the power supply wirings in first and second housings 110 and 120, in the case where the DC voltage is supplied from the AC adaptor to DC input section 307 of first housing 110. The black arrows in FIGS. 8 and 9 represent the flow of electric current.

As shown in FIG. 8, in the case where the DC voltage is supplied from the AC adaptor to DC input section 207 of second housing 120, the electric current flows from DC input section 207 to load 201, and the electric current flows from DC input section 207 to battery 203 via charging IC 205. On top of that, the electric current from DC input section 207 flows through power supply wiring 142b situated in hinge section 140b before reaching to load 301.

As shown in FIG. 9, in the case where the DC voltage is supplied to DC input section 307 of first housing 110, the electric current flows from DC input section 307 to battery 303 via charging IC 305. On top of that, the electric current from DC input section 307 runs through power supply wiring 142a situated in hinge section 140b and flows into second housing 120 before reaching to load 201 and battery 203. At the same time, a part of the electric current running through power supply wiring 142a situated in hinge section 140b returns into first housing 110 via power supply wiring 142b situated in hinge section 140b, and flows to load 31.

As discussed above, in the case where the DC voltage is supplied to DC input section 307 of first housing 110, the electric current flowing from first housing 110 enters second housing 120, and then returns to first housing 110. The electric currents directing opposite to each other flow through power supply wirings 142a and 142b situated closely to each other within one hinge section 140b. This mechanism allows the magnetic fluxes produced on power supply wirings 142a and 142b to cancel each other, as shown at region 160 in FIG. 9. As a result, noise radiation can be reduced.

1-3. Advantage and Others

Information processing apparatus 100 discussed above comprises the following structural elements:
first housing 110 for accommodating first circuit 152;
second housing 120 for accommodating second circuit 122;
a plurality of hinge sections 140a and 140b connecting with first housing 110 and allowing second housing 120 to rotate with respect to first housing 110;
first power supply wiring 142a for supplying electric power from first circuit 152 (or first circuit board 153) to second circuit 122 (or second circuit board 123); and
second power supply wiring 142b for supplying electric power from second circuit 122 (or second circuit board 123) to first circuit 152 (or first circuit board 153).

First power supply wiring 142a and second power supply wiring 142b are situated such that they are led through one (hinge section 140b) of the plurality of hinge sections.

The placement of power supply wirings 142a and 142b in one hinge section 140b allows the magnetic flux produced on power supply wirings 142a and 142b to cancel each other, so that noise radiation can be reduced and also EMI characteristics can be improved.

Second Exemplary Embodiment

Figure 10:
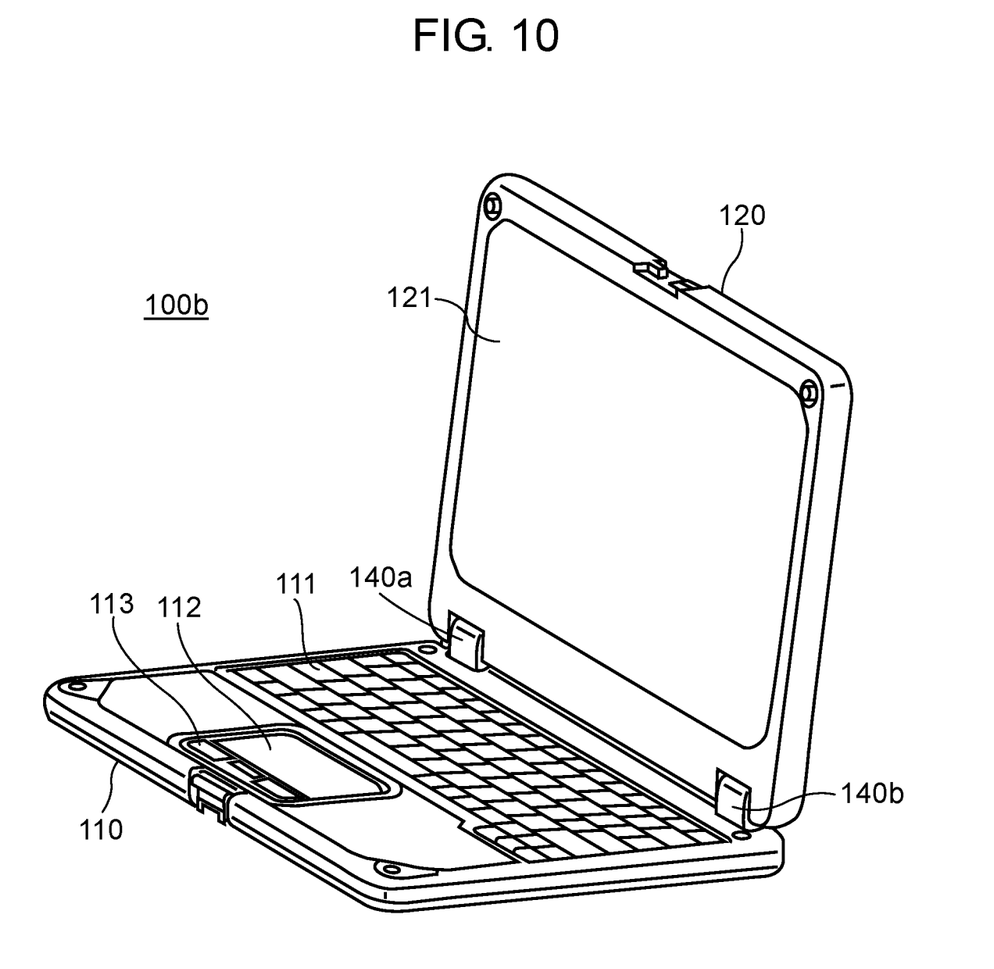
FIG. 10 is a perspective view of an information processing apparatus in accordance with a second embodiment of the present disclosure.

FIG. 10 is a perspective view of an information processing apparatus in accordance with the second embodiment of the present disclosure. Information processing apparatus 100 discussed in the first embodiment is structured such that second housing 120 can be detached from first housing 110 with holder 130. Information processing apparatus 100b in accordance with this second embodiment, on the other hand, includes no holder 130, and is structured such that second housing 120 is connected to first housing 110 via hinge sections 140a and 140b. With this structure, the power supply wiring, which connects a circuit in first housing 110 to a circuit in second housing 120, is led through either one of hinge sections 140a or 140b. This structure allows reducing noise radiation similarly to what is done in the first embodiment.

Other Embodiments

As discussed above, the first and the second embodiments are demonstrated hereinbefore as examples of the technique disclosed in this application. However, the technique in the present disclosure is not limited to these examples, and is applicable to other embodiments where changes, replacements, additions, or omissions are appropriately done. On top of that, structural elements described in the first and the second embodiments can be combined to introduce a new embodiment. Other embodiments are thus described hereinafter.

The first embodiment shows the structure of the hinge section in FIG. 3, where the wiring is led through the hinge section; however, the structure of the hinge section is not limited to this one. The structure of the hinge section can be in any form as long as it is rotatable with respect to the first housing and is hollow for the wiring to be led through.

The first and the second embodiments address a detachable computer as an example of an electronic apparatus. The idea of the present disclosure is applicable to other kinds of electronic apparatuses each of which includes two housing connected together via a hinge section. For instance, the idea is applicable to electronic apparatuses, including such as a notebook personal computer, a word-processor, or an electronic dictionary. Each of these apparatuses has a hinge section that allows opening or closing the two housings.

The embodiments provided hereinbefore exemplify the technique disclosed in the present disclosure, and the accompanying drawings as well as the detailed descriptions are provided to aid the ordinary skilled person in the art to understand the present disclosure.

The structural elements in the accompanying drawings and the detailed descriptions hereinbefore include not only essential elements to solve the problem but also non-essential ones that are needed simply for exemplifying the foregoing technique. The descriptions of these non-essential structural elements in the accompanying drawings and the embodiments should not be construed as non-essential ones to be essential ones.

The embodiments discussed above only exemplify the technique disclosed in the present disclosure, so that changes, replacements, addition, or omissions can be done within the scope of the claims or the equivalent scope thereto.

INDUSTRIAL APPLICABILITY

The present disclosure is useful for an electronic apparatus, formed of housings openable/closable with a hinge, including such as a notebook personal computer, a word-processor, and an electronic dictionary.

What is claimed is:

1. An electronic apparatus comprising:
a first housing for accommodating a first circuit;
a second housing for accommodating a second circuit;
a plurality of hinge sections connecting with the first housing and allowing the second housing to rotate with respect to the first housing;
a first power supply wiring for supplying electric power from the first circuit to the second circuit; and
a second power supply wiring for supplying electric power from the second circuit to the first circuit,
wherein the first power supply wiring and the second power supply wiring are situated to be led through any one of the plurality of hinge sections.

2. The electronic apparatus according to claim 1, wherein the first housing includes a first power supply input section for receiving an external DC power supply voltage and a rechargeable first battery, and
wherein the second housing includes a second power supply input section for receiving an external DC power supply voltage and a rechargeable second battery.

3. The electronic apparatus according to claim 1, further comprising a holder connecting with the plurality of hinge sections and holding a part of the second housing in a detachable manner.

4. The electronic apparatus according to claim 1, wherein the first housing includes an input section for a user to operate, and the second housing includes a display section.

5. The electronic apparatus according to claim 1, wherein the plurality of hinge sections are two hinge sections.

\* \* \* \* \*